UNITED STATES PATENT OFFICE.

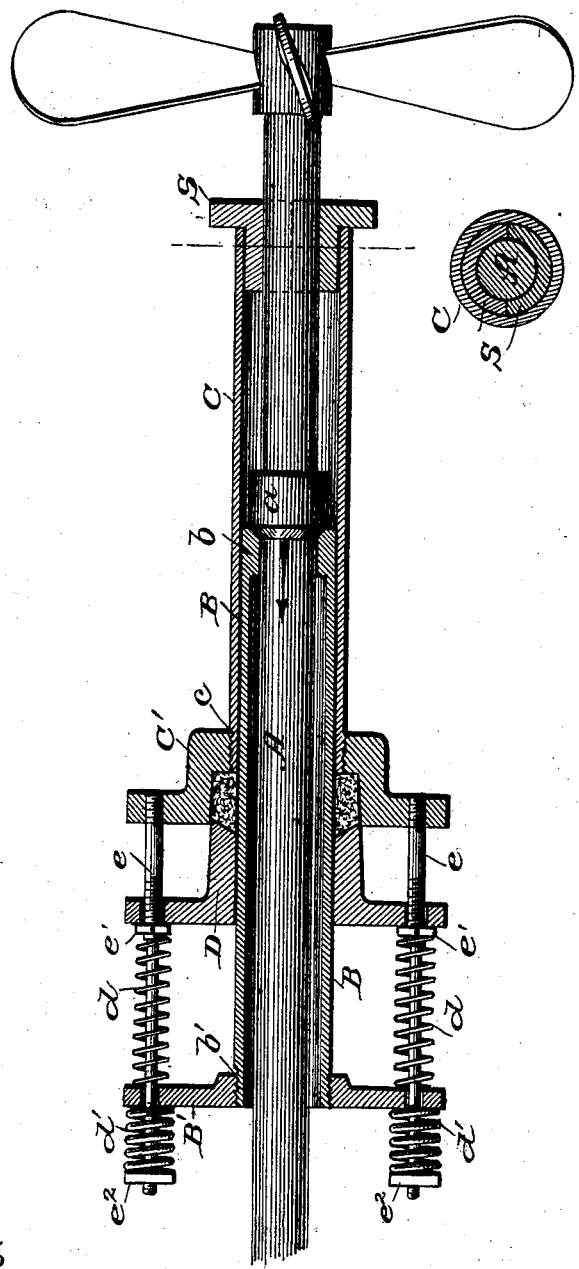

JOHN THOMAS SHEPARD, OF EVANSVILLE, INDIANA, ASSIGNOR OF ONE-HALF TO FRANK TARDY, OF SAME PLACE.

PROPELLER-SHAFT BEARING.

SPECIFICATION forming part of Letters Patent No. 660,399, dated October 23, 1900.

Application filed April 6, 1900. Serial No. 11,829. (No model.)

*To all whom it may concern:*

Be it known that I, JOHN THOMAS SHEPARD, of Evansville, in the county of Vanderburg and State of Indiana, have invented a new and useful Improvement in Propeller-Shaft Bearings, of which the following is a specification.

The object of my invention is to provide a bearing for the propeller-shaft of a vessel which will prevent wear on the packing; and it consists in the peculiar construction and arrangement of the parts, which I will now proceed to describe, reference being had to the accompanying drawing, in which the figure is a longitudinal section taken through the shaft-bearings.

In the drawing, A represents the propeller-shaft, which is made with a rigid collar or shoulder $a$ formed thereon or attached thereto, which collar has a beveled face on one side. B is a tube encompassing said shaft and having at one end an internal collar $b$, which has a beveled face that forms a bearing for the collar $a$ of the shaft to press against, producing a tightly-fitting cone-joint at the point. The opposite end of the tube B is screw-threaded exteriorly at $b'$ and has screwed upon it an interiorly-threaded disk plate B'. A still larger tube C encompasses the tube B and is screw-threaded at $c$ to receive a stuffing-box C', which is screwed thereon, and is provided with two or more rigidly-attached studs or stems $e\ e$, which project in direction parallel to the shaft and pass through perforations in the plate B'. A stuffing-box gland D encompasses the tube B and compresses between it and the stuffing-box C' the packing to form a tight joint, but which packing does not come in contact with the revolving shaft. This gland is also provided with perforations in its outer flange, through which pass the screw-studs $e\ e$, nuts $e'\ e'$ being arranged on the screw-threads of $e$ to tighten up the gland. Between the gland D and the plate B' and wound upon the studs $e\ e$ are light helical springs $d\ d$, and upon the studs $e\ e$, outside of the plate B', are other helical springs $d'\ d'$, much stronger than the springs $d$. These stronger springs $d'$ are prevented from coming off the ends of the studs by nuts $e^2$, screwed upon the outer threaded ends of said studs. Now when a longitudinal strain is put upon the propeller-shaft A in the direction of the arrow, such as is caused by the revolution of the propeller-blades, this strain is transmitted from shaft A and its collar $a$ to the collar $b$, which makes a water-tight joint. The tube B being rigidly connected to the plate B' causes this strain to come against the springs $d'$, studs $e$, stuffing-box C', and outer tube C and the vessel. The other springs $d$ act merely as a cushion to hold the plate B' against looseness or free movement to the right.

The joint between the collar $a$ and the collar $b$ is a closely-fitted ground joint, which is held tightly closed by spring-pressure and does not permit water to leak through. Excessive wear of the collar $b$ is also prevented by the slightly-yielding character of the tube B against the springs $d'$. The packing of the stuffing-box, it will be seen, is not in contact with the revolving shaft at all, and hence is not subject to its wear and does not require to be packed so tightly.

At the outer end of the tube C there is a loose bushing-sleeve S, made in two half-sections and secured to the tube C.

Having thus described my invention, what I claim as new, and desire to secure by Letters Patent, is—

1. A propeller-shaft combined with a surrounding tube, and springs whereby it is made yielding and spring-seated against strain in longitudinal direction substantially as described.

2. A propeller-shaft having a collar or shoulder, and an inclosing tube having another collar or shoulder bearing against the same, springs to render it yielding against endwise movement, and a stuffing-box arranged outside of the tube substantially as described.

3. A propeller-shaft having a collar or shoulder, an inclosing tube having another collar or shoulder bearing against the same, springs to render it yielding against endwise movement, a second tube encompassing the first and bearing at its end a stuffing-box fitting the inner tube substantially as described.

4. A propeller-shaft having a collar or shoulder, an inclosing tube having another collar or shoulder bearing against the same, and a rigidly-attached plate at the other end, a second tube inclosing the first a stuffing-box with parallel studs projecting beyond it, a gland fitting the inner tube and guided on 5 the said studs, and springs arranged on both sides of the end plate of the inner tube substantially as described.

In testimony whereof I have signed my name to this specification in the presence of two subscribing witnesses.

JOHN THOMAS SHEPARD.

Witnesses:
PERCY C. HOPKINS,
CLARENCE BOYDEN.